(12) United States Patent
Lee et al.

(10) Patent No.: US 9,162,104 B1
(45) Date of Patent: Oct. 20, 2015

(54) INVERTEDE EXERCISE CYCLING ASSEMBLY

(71) Applicants: John R. Lee, Tacoma, WA (US); Sondra J. Lee, Tacoma, WA (US)

(72) Inventors: John R. Lee, Tacoma, WA (US); Sondra J. Lee, Tacoma, WA (US)

( * ) Notice: Subject to any disclaimer, the term of this patent is extended or adjusted under 35 U.S.C. 154(b) by 124 days.

(21) Appl. No.: 14/014,655

(22) Filed: Aug. 30, 2013

(51) Int. Cl.
*A63B 22/06* (2006.01)
*A63B 69/16* (2006.01)

(52) U.S. Cl.
CPC .................. *A63B 22/0694* (2013.01)

(58) Field of Classification Search
CPC .... A63B 22/06; A63B 22/0605; A63B 22/08; A63B 22/0694; A63B 2022/0652; A63B 2022/0635
USPC ...................................... 482/57–65
See application file for complete search history.

(56) References Cited

U.S. PATENT DOCUMENTS

| | | | | |
|---|---|---|---|---|
| 597,843 | A * | 1/1898 | French | 104/78 |
| 3,455,295 | A | 7/1969 | Kellogg | |
| 3,662,747 | A * | 5/1972 | Williams | 601/5 |
| 3,750,479 | A * | 8/1973 | Gause et al. | 73/379.07 |
| 4,519,604 | A * | 5/1985 | Arzounian | 482/57 |
| 4,902,002 | A * | 2/1990 | Huang | 482/62 |
| 4,976,426 | A * | 12/1990 | Szabo et al. | 482/6 |
| D320,826 | S | 10/1991 | Hildebrandt et al. | |
| 5,160,305 | A | 11/1992 | Lin | |
| 5,449,334 | A * | 9/1995 | Kingsbury | 482/57 |
| 5,569,128 | A | 10/1996 | Dalebout | |
| 5,709,633 | A * | 1/1998 | Sokol | 482/62 |
| 5,785,631 | A | 7/1998 | Heidecke | |
| 5,823,915 | A | 10/1998 | Chen | |
| 6,270,446 | B1 * | 8/2001 | Abelbeck et al. | 482/57 |
| 6,547,702 | B1 * | 4/2003 | Heidecke | 482/62 |
| 6,551,219 | B1 * | 4/2003 | Brown | 482/57 |
| 6,663,541 | B1 * | 12/2003 | Yang | 482/57 |
| 6,926,645 | B1 * | 8/2005 | Stearns et al. | 482/62 |
| 7,967,734 | B1 | 6/2011 | Damian et al. | |
| 8,047,968 | B2 * | 11/2011 | Stewart et al. | 482/51 |
| 2003/0114275 | A1 * | 6/2003 | Falbo et al. | 482/57 |
| 2013/0017930 | A1 * | 1/2013 | Walton | 482/62 |

* cited by examiner

*Primary Examiner* — Loan H Thanh
*Assistant Examiner* — Garrett Atkinson

(57) ABSTRACT

An inverted exercise cycling assembly allows a user to exercise their lower body while lying with a back to a ground surface. The assembly includes a support assembly configured for positioning upon a ground surface. A post is coupled to the support assembly. A cycling frame is coupled to the post. A flywheel is rotatably coupled to the cycling frame. A pair of pedals is coupled to the cycling frame and mechanically coupled to the flywheel such that rotation of the pedals rotates the flywheel. A rear axle is coupled to the cycling frame and extends between the pedals. The rear axle is operationally coupled to the pedals wherein the pedals urge the rear axle to rotate. A front axle is coupled to the cycling frame and extends through the flywheel. The front axle is operationally coupled to the pedals wherein the pedals urge the front axle to rotate.

15 Claims, 5 Drawing Sheets

INVERTEDE EXERCISE CYCLING ASSEMBLY

BACKGROUND OF THE DISCLOSURE

Field of the Disclosure

The disclosure relates to exercise cycling assemblies and more particularly pertains to a new exercise cycling assembly for allowing a user to exercise the user's lower body while lying with a back to a ground surface.

SUMMARY OF THE DISCLOSURE

An embodiment of the disclosure meets the needs presented above by generally comprising a support assembly configured for positioning upon a ground surface. A post is coupled to the support assembly. A cycling frame is coupled to the post. A flywheel is rotatably coupled to the cycling frame. A pair of pedals is coupled to the cycling frame and mechanically coupled to the flywheel such that rotation of the pedals rotates the flywheel. A rear axle is coupled to the cycling frame and extends between the pedals. The rear axle is operationally coupled to the pedals wherein the pedals urge the rear axle to rotate. A front axle is coupled to the cycling frame and extends through the flywheel. The front axle is operationally coupled to the pedals wherein the pedals urge the front axle to rotate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
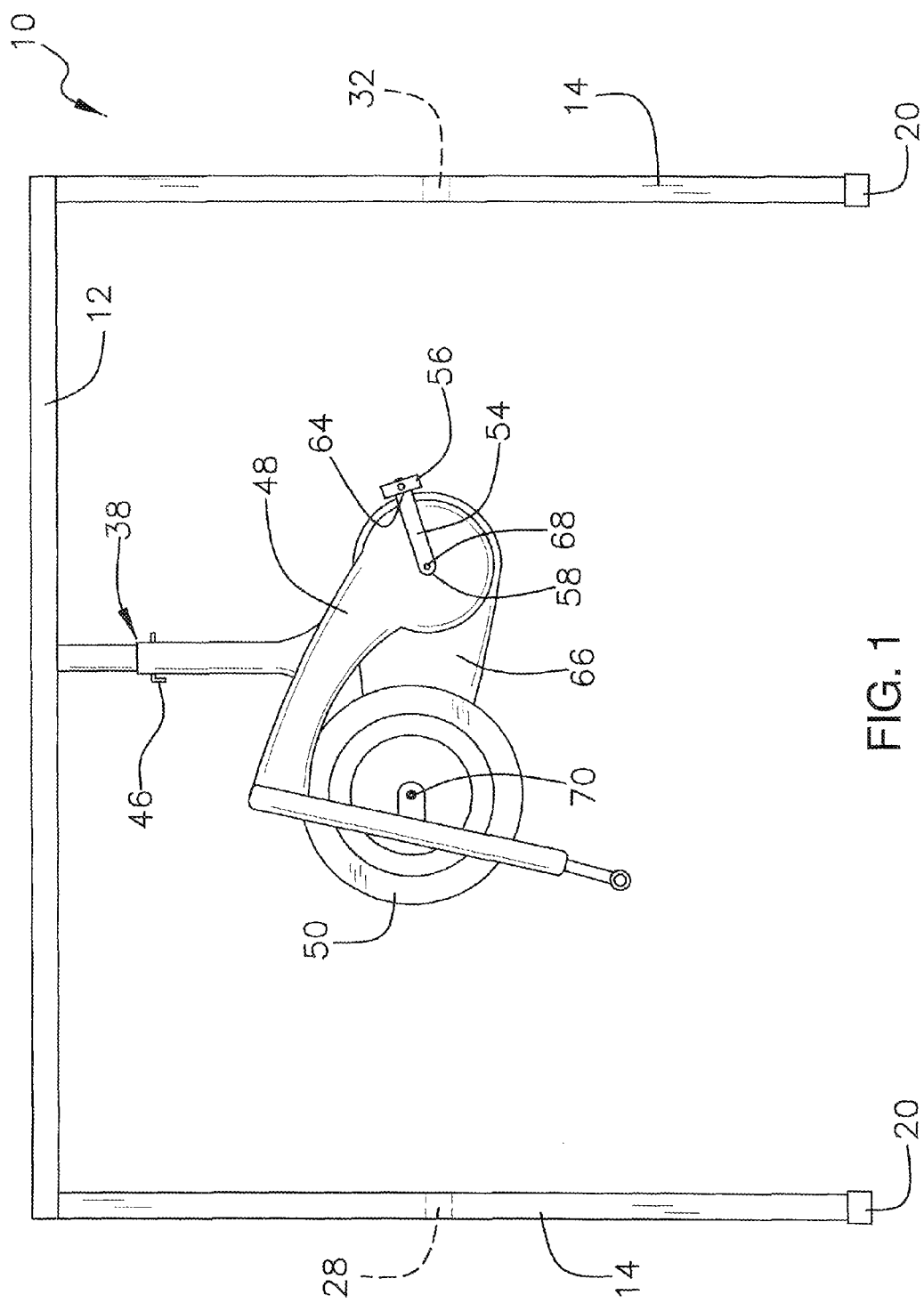
FIG. 1 is a front view of a inverted exercise cycling assembly according to an embodiment of the disclosure.
Figure 2:
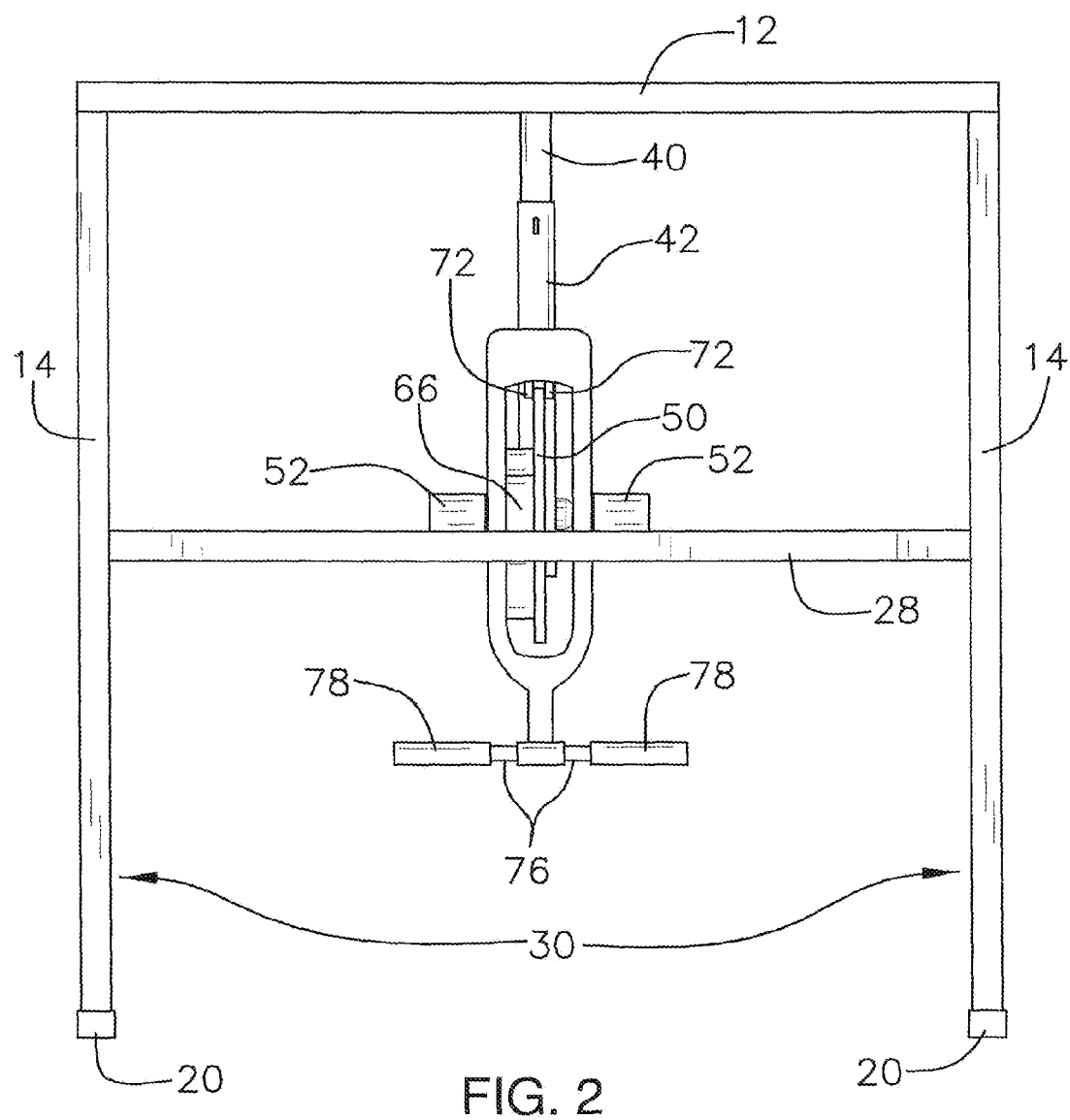
FIG. 2 is a side view of an embodiment of the disclosure.
Figure 3:
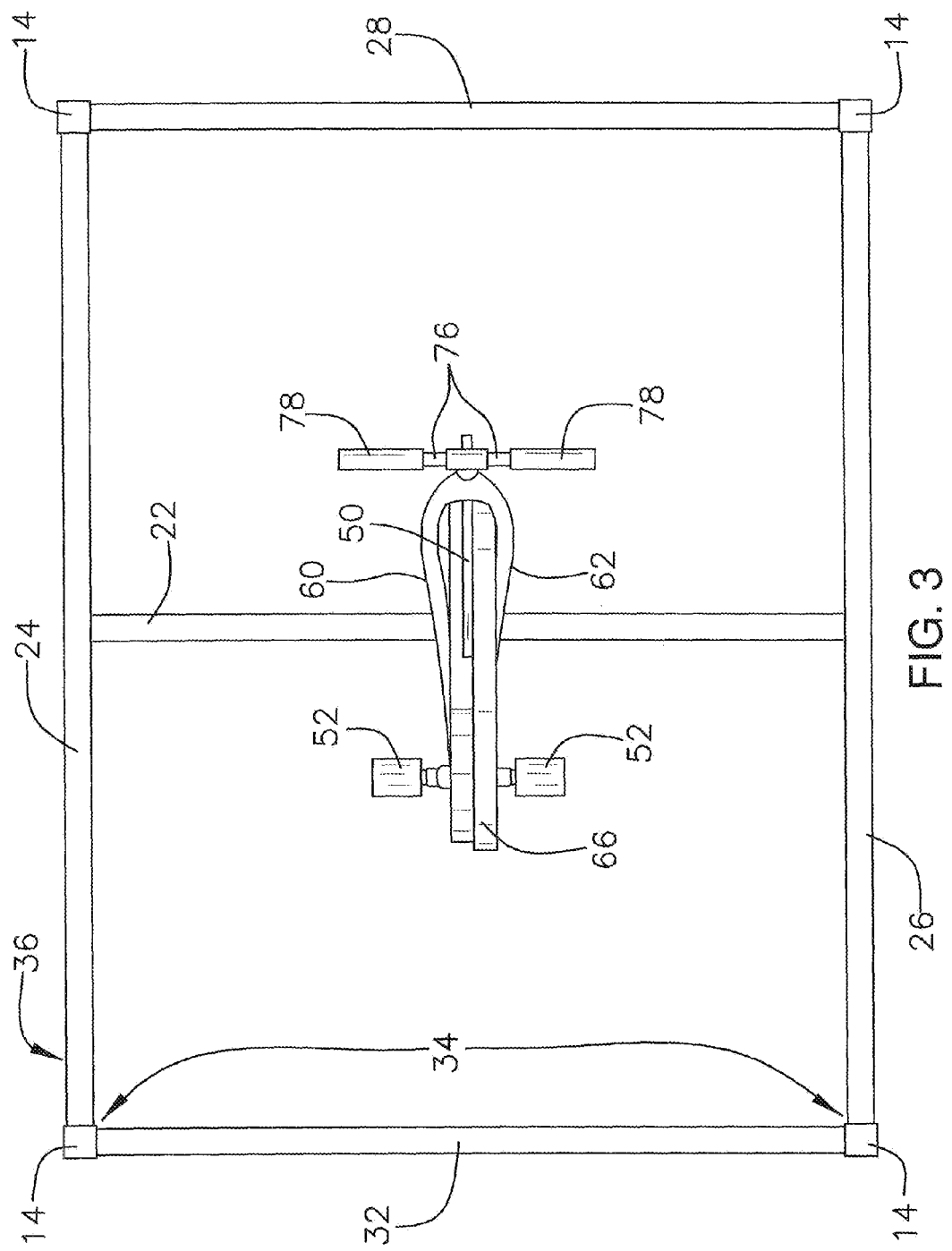
FIG. 3 is a bottom view of an embodiment of the disclosure.
Figure 4:
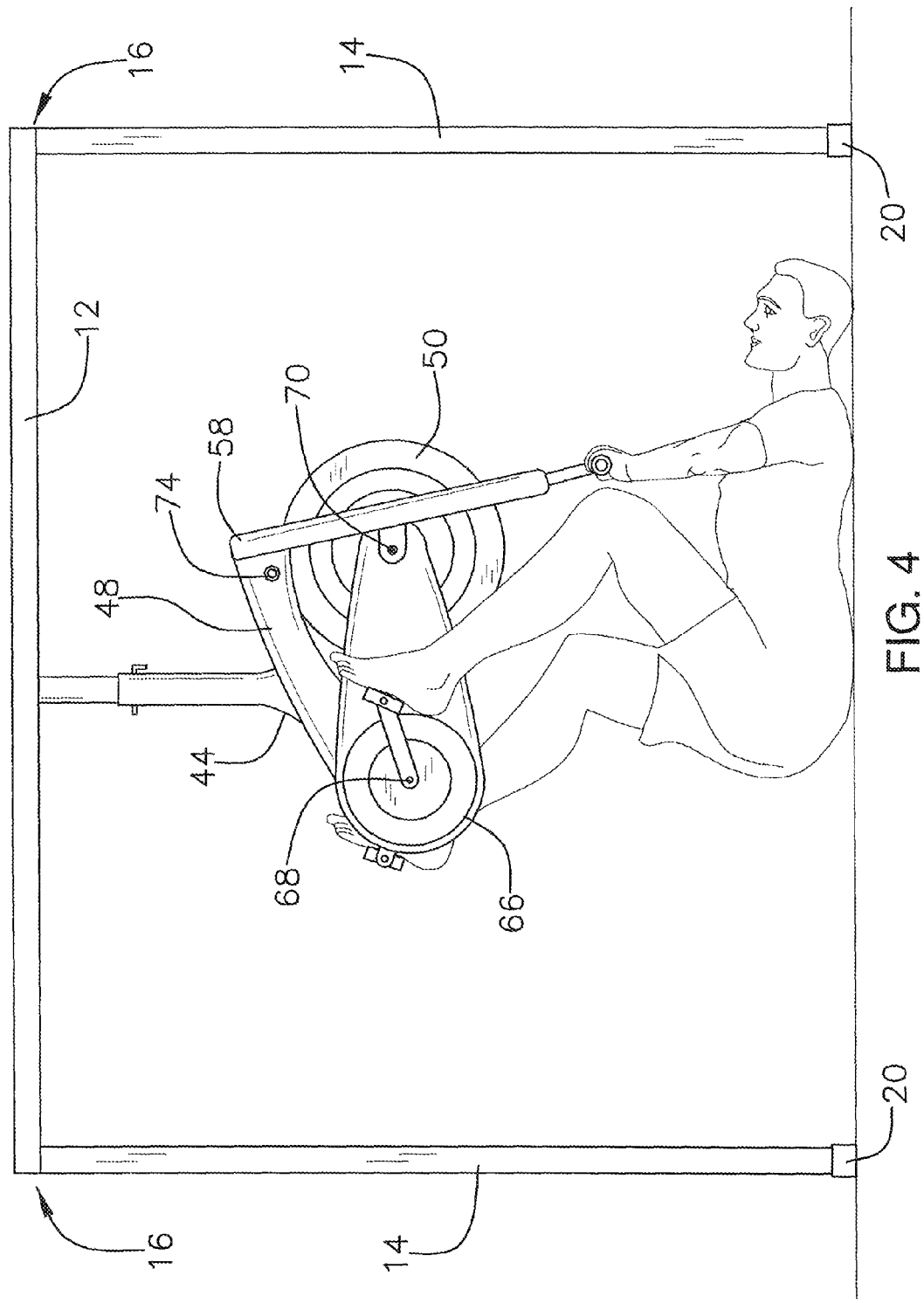
FIG. 4 is a rear view of an embodiment of the disclosure in use.
Figure 5:
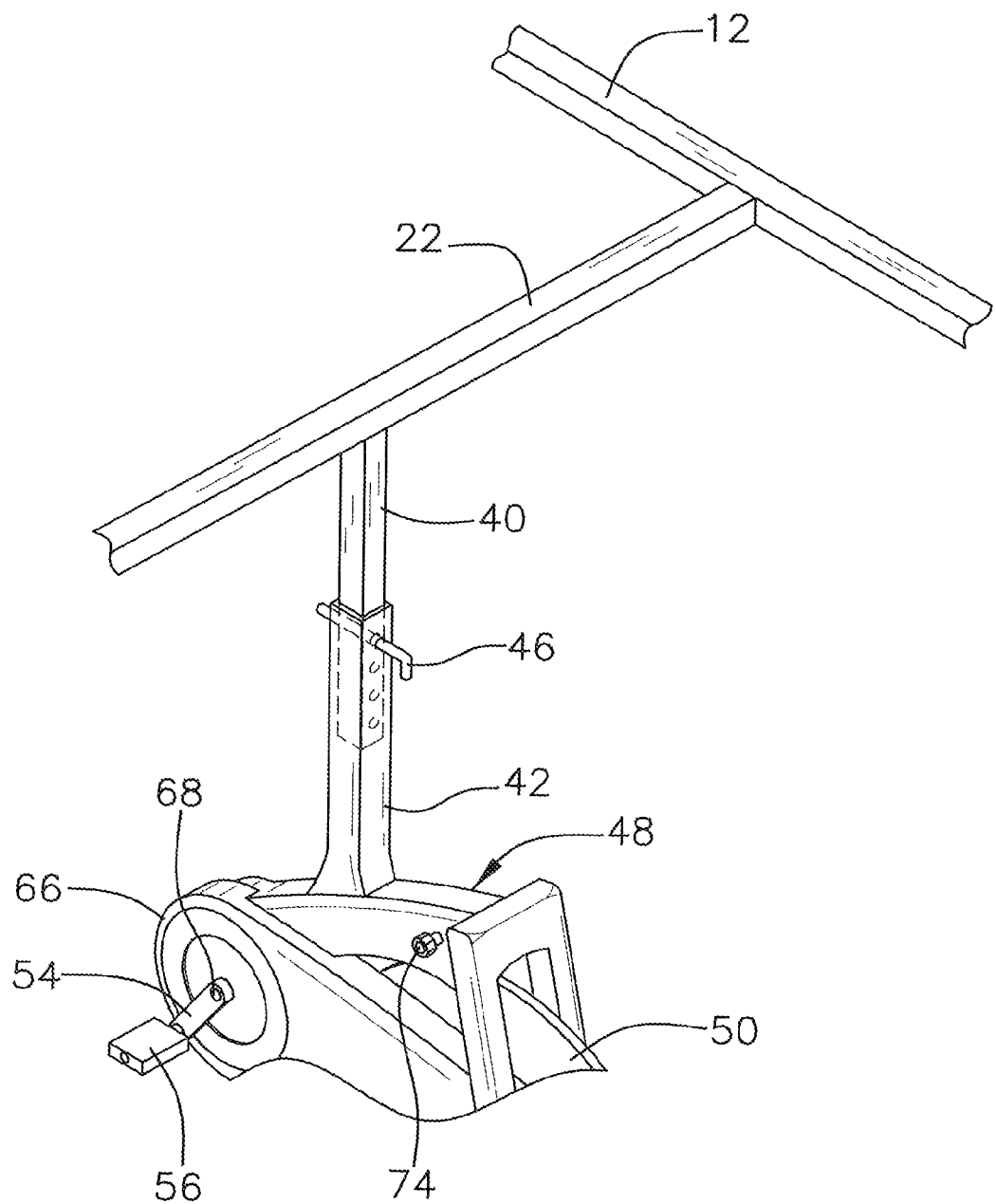
FIG. 5 is a cut-away rear side perspective view of an embodiment of the disclosure.

With reference now to the drawings, and in particular to FIGS. 1 through 5 thereof, a new exercise cycling assembly embodying the principles and concepts of an embodiment of the disclosure and generally designated by the reference numeral 10 will be described.

As best illustrated in FIGS. 1 through 5, the inverted exercise cycling assembly 10 generally comprises a plurality of support members 12. Each of the support members 12 is coupled to an adjacently positioned one of the support members 12. The support members 12 may be arranged to form a rectangle. A plurality of legs 14 is provided. Each of the legs 14 is coupled to and extends downwardly from an associated juncture 16 formed between adjacently positioned ones of the support members 12. A bottom end 18 of each of the legs 14 has an end cap 20 coupled thereto. The end caps 20 are configured for positioning on a ground surface. A first crossbar 22 is coupled to and extends between a first 24 and second 26 one of the support members 12. A second crossbar 28 is coupled to and extends between a first pair 30 of legs 14. A third crossbar 32 is coupled to and extends between a second pair 34 of legs 14. The first 22, second 28 and third 32 crossbars are positioned parallel with respect to each other. The support members 12, the legs 14, and each of the first 22, second 28 and third 32 crossbars define a support assembly 36 configured for positioning upon the ground surface. The support assembly 36 may have a height between approximately 100.0 centimeters and 125.0 centimeters; a length between approximately 100.0 centimeters and 125.0 centimeters; and a width between approximately 100.0 centimeters and 135.0 centimeters.

A post 38 is coupled to and extends downwardly from the first crossbar 22. The post 38 has a first section 40 and a second section 42 that may be slidable relative to each other wherein the post 38 is telescopic. A lower end 44 of the post 38 may taper outwardly. A fixing pin 46 secures the first 40 and second 42 sections together at a selectable distance from the first crossbar 22 when the fixing pin 46 is passed through aligned holes in each of the first section 40 and the second section 42.

A cycling frame 48 is coupled to the lower end 44 of the post 38. A flywheel 50 is rotatably coupled to the cycling frame 48. The flywheel 50 is coupled to and extends outwardly from a front end 51 of the cycling frame 48. A pair of pedals 52 is coupled to the cycling frame 48. Each of the pedals 52 comprises a crank 54 and a body 56. Each of the cranks 54 has a first end 58 coupled to and extending outwardly from opposite sides 60, 62 of the cycling frame 48 and a second end 64 coupled to an associated body 56. The pedals 52 are mechanically coupled to the flywheel 50 such that rotation of the pedals 52 causes the flywheel 50 to rotate. A drive belt 66 is coupled to the cycling frame 48. The drive belt 66 is mechanically coupled to the flywheel 50 in a conventional manner such that rotation of the drive belt 66 about the cycling frame 48 causes the flywheel 50 to rotate. Alternatively, a drive chain may be used in place of the drive belt 66. A rear axle 68 is coupled to the cycling frame 48 and extends between the pedals 52. The rear axle 68 is operationally coupled to the pedals 52 wherein the pedals 52 urge the rear axle 68 to rotate. A front axle 70 is coupled to the cycling frame 48 and extends through the flywheel 50. The front axle 70 is operationally coupled to the pedals 52 wherein the pedals 52 urge the front axle 70 to rotate.

A pair of plates 72 is coupled to the cycling frame 48. The flywheel 50 is positioned between each of the plates 72. A tension knob 74 is coupled to the cycling frame 48. The tension knob 74 is operationally coupled to the flywheel 50 wherein the tension knob 74 is adjustable to selectively engage the flywheel 50. The tension knob 74 is configured to selectively adjust an amount of frictional engagement of the plates 72 against the flywheel 50.

A pair of handlebars 76 is coupled to the cycling frame 48. The handlebars 76 extend downwardly from the cycling frame 48. The handlebars 76 are configured for positioning in spaced relationship to the ground surface. A grip 78 is coupled to each of the handlebars 76.

In use, as stated above and shown in the Figures, a user positions the support assembly 36 on a ground surface. A height of the post 38 is adjusted by sliding the first 40 and second sections 42 relative to each other, while the fixing pin 46 is used to secure the first 40 and second sections 42 together. The user lies with a back to the ground surface underneath the cycling frame 48, places his feet upon the pedals 52, his hands upon the handlebars 76, and then rotates the pedals 52 using his feet and legs. The tension knob 74 is adjusted to select an amount of frictional engagement of the plates 72 against the flywheel 50. The user can also grasp the handlebars 76 to perform sit-ups or crunches from the ground surface. In this manner, the assembly 10 allows a user to exercise his legs, stomach, and buttocks while laying on a ground surface without putting stress on the user's body.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. An inverted exercise cycling assembly comprising:
    a support assembly configured for positioning upon a ground surface, said support assembly including a plurality of support members, each of said support members being coupled to an adjacently positioned one of said support members, said support assembly including a plurality of legs, each of said legs being coupled to and extending downwardly from an associated juncture formed between adjacently positioned ones of said support members wherein said support members are configured for being positioned in spaced relationship over the ground surface;
    a post coupled to said support assembly, said post extending downwardly relative to said support members wherein said post is configured to extend towards the ground surface;
    a cycling frame fixedly coupled to said post wherein said cycling frame is suspended in a fixed position beneath said support members;
    a flywheel rotatably coupled to said cycling frame;
    a pair of pedals being coupled to said cycling frame such that said pedals are configured to be operated by a user in a supine position on the ground surface, said pedals being mechanically coupled to said flywheel such that rotation of said pedals causes said flywheel to rotate;
    a rear axle coupled to said cycling frame and extending between said pedals, said rear axle being operationally coupled to said pedals wherein said pedals urge said rear axle to rotate; and
    a front axle coupled to said cycling frame and extending through said flywheel, said front axle being operationally coupled to said pedals wherein said pedals urge said front axle to rotate.

2. The assembly of claim 1, further comprising said support members being arranged to form a rectangle.

3. The assembly of claim 1, further comprising a bottom end of each of said legs having an end cap coupled thereto, said end caps being configured for positioning on a ground surface.

4. The assembly of claim 1, said support assembly further including a first crossbar coupled to and extending between a first and second one of said support members.

5. The assembly of claim 4, said support assembly further including;
    a second crossbar coupled to and extending between a first pair of legs;
    a third crossbar coupled to and extending between a second pair of legs; and
    wherein said first, second and third crossbars are positioned parallel with respect to each other.

6. The assembly of claim 4, further comprising said post being coupled to and extending downwardly from said first crossbar, said cycling frame being coupled to a lower end of said post.

7. The assembly of claim 1, further comprising:
    said post having a first section and a second section being slidable relative to each other wherein said post is telescopic; and
    a fixing pin securing said first and second sections together at a selectable distance from said first crossbar when said fixing pin is passed through aligned holes in each of said first section and said second section.

8. The assembly of claim 1, further comprising said flywheel being coupled to and extending outwardly from a front end of said cycling frame.

9. The assembly of claim 1, further comprising each of said pedals comprising a crank and a body, each of said cranks having a first end being coupled to and extending outwardly from opposite sides of said cycling frame and a second end coupled to an associated said body.

10. The assembly of claim 1, further comprising a drive belt coupled to said cycling frame, said drive belt being mechanically coupled to said flywheel such that rotation of said drive belt about said cycling frame causes said flywheel to rotate.

11. The assembly of claim 1, further comprising a tension knob coupled to said cycling frame, said tension knob being operationally coupled to said flywheel wherein said tension knob is adjustable to selectively engage said flywheel.

12. The assembly of claim 11, further comprising:
    a pair of plates coupled to said cycling frame, said flywheel being positioned between each of said plates; and
    wherein said tension knob is configured to selectively adjust an amount of frictional engagement of said plates against said flywheel.

13. The assembly of claim 1, further comprising a pair of handlebars coupled to said cycling frame, said handlebars extending downwardly from said cycling frame, said handlebars being configured for positioning in spaced relationship to the ground surface under said support members and said cycling frame such that said handlebars are configured to be grasped by the user in the supine position on the ground surface while operating said pair of pedals.

14. The assembly of claim 13, further comprising a grip coupled to each of said handlebars.

15. An inverted exercise cycling assembly comprising:
    a plurality of support members, each of said support members being coupled to an adjacently positioned one of said support members, said support members being arranged to form a rectangle;

a plurality of legs, each of said legs being coupled to and extending downwardly from an associated juncture formed between adjacently positioned ones of said support members wherein said support members are configured for being positioned in spaced relationship over the ground surface;

a bottom end of each of said legs having an end cap coupled thereto, said end caps being configured for positioning on a ground surface;

a first crossbar coupled to and extending between a first and second one of said support members;

a second crossbar coupled to and extending between a first pair of legs;

a third crossbar coupled to and extending between a second pair of legs, said first, second and third crossbars being positioned parallel with respect to each other;

a post coupled to and extending downwardly from said first crossbar, said post extending downwardly relative to said support members wherein said post is configured to extend towards the ground surface, said post having a first section and a second section being slidable relative to each other wherein said post is telescopic, a lower end of said post tapering outwardly;

a fixing pin securing said first and second sections together such that said post extends a selectable fixed distance from said first crossbar when said fixing pin is passed through aligned holes in each of said first section and said second section;

a cycling frame being fixedly coupled to said lower end of said post wherein said cycling frame is suspendable in a fixed position a selectable distance beneath said support members;

a flywheel being rotatably coupled to said cycling frame, said flywheel being coupled to and extending outwardly from a front end of said cycling frame;

a pair of plates coupled to said cycling frame, said flywheel being positioned between each of said plates;

a pair of pedals being coupled to said cycling frame, each of said pedals comprising a crank and a body, each of said cranks having a first end being coupled to and extending outwardly from opposite sides of said cycling frame and a second end coupled to an associated said body, said pedals being mechanically coupled to said flywheel such that rotation of said pedals causes said flywheel to rotate;

a drive belt coupled to said cycling frame, said drive belt being mechanically coupled to said flywheel such that rotation of said drive belt about said cycling frame causes said flywheel to rotate;

a rear axle coupled to said cycling frame and extending between said pedals, said rear axle being operationally coupled to said pedals wherein said pedals urge said rear axle to rotate;

a front axle coupled to said cycling frame and extending through said flywheel, said front axle being operationally coupled to said pedals wherein said pedals urge said front axle to rotate;

a tension knob coupled to said cycling frame, said tension knob being operationally coupled to said flywheel wherein said tension knob is adjustable to selectively engage said flywheel, said tension knob being configured to selectively adjust an amount of frictional engagement of said plates against said flywheel;

a pair of handlebars coupled to said cycling frame, said handlebars extending downwardly from said cycling frame, said handlebars being configured for positioning in spaced relationship to the ground surface under said support members and said cycling frame such that said handlebars are configured to be grasped by the user in the supine position on the ground surface while operating said pair of pedals; and a grip coupled to each of said handlebars.

* * * * *